A. FAY.
METHOD OF PRODUCING BUTTER.
APPLICATION FILED FEB. 19, 1912.
1,034,350.
Patented July 30, 1912.
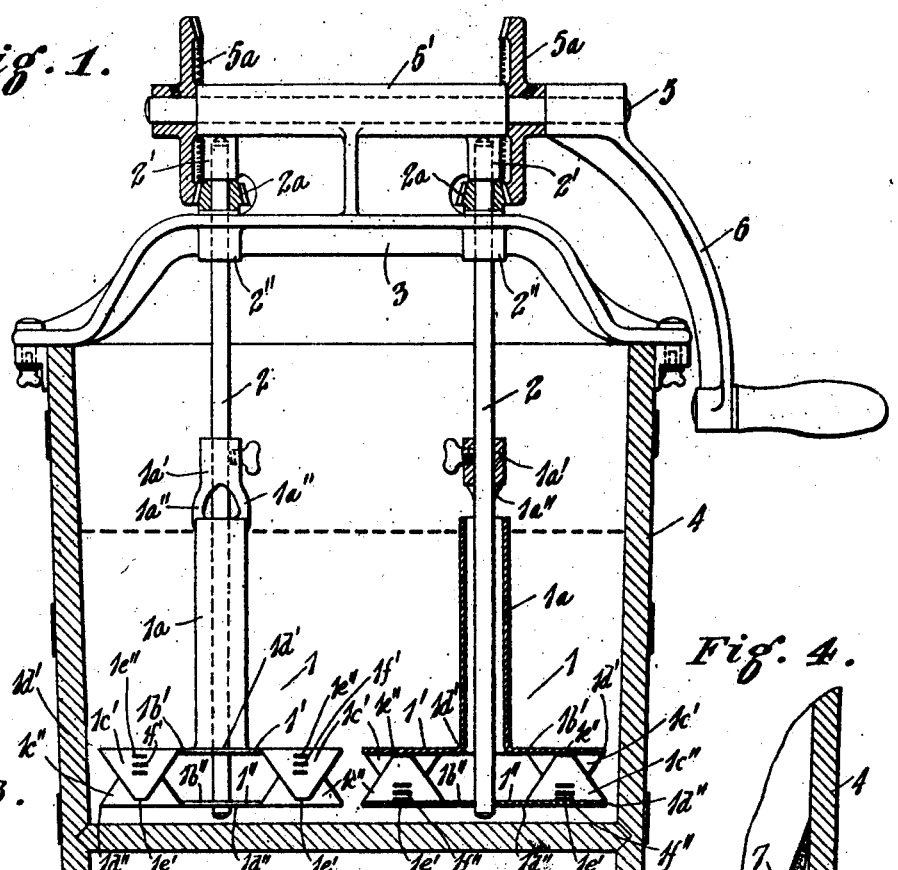
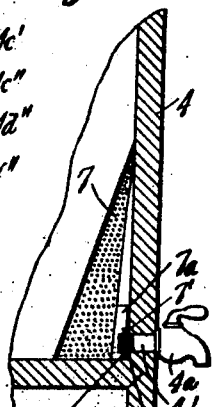
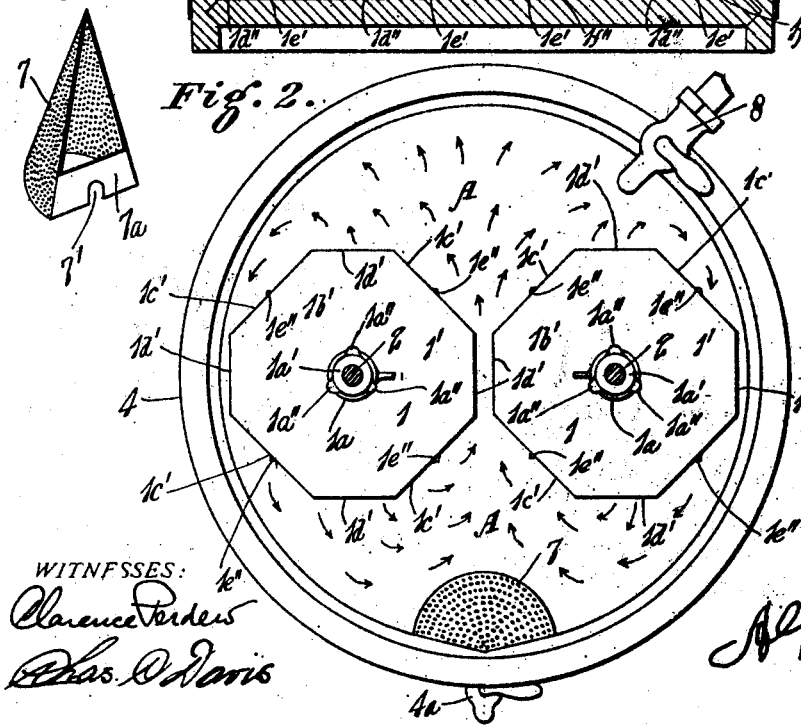
WITNESSES:
INVENTOR.

UNITED STATES PATENT OFFICE.

ALPHEUS FAY, OF LOUISVILLE, KENTUCKY.

METHOD OF PRODUCING BUTTER.

1,034,350.   Specification of Letters Patent.   Patented July 30, 1912.

Application filed February 19, 1912. Serial No. 678,577.

*To all whom it may concern:*

Be it known that I, ALPHEUS FAY, a citizen of the United States, residing at Louisville, in the county of Jefferson and State of Kentucky, have invented a certain new and useful Method of Producing Butter, of which the following is a specification.

My invention relates to butter processes, and its object is to secure a more thorough separation of the butter elements from the other milk elements, either with the use of sweet or sour milk, or sweet or sour cream.

My object, further, is to obtain a more homogeneous butter, and one with better keeping qualities.

My invention consists in the details of operation hereinafter more fully described and claimed.

The drawing illustrates the apparatus preferred for operating according to my method, Figure 1 illustrating the apparatus in sectional elevation, and Fig. 2 being a plan view of the vessel, with the operating mechanism removed, the arrows indicating the direction of the currents set up in the contents of the vessel. Fig. 3 is a detail perspective view of the strainer; Fig. 4 is a partial sectional view of the vessel, showing the strainer in position; and Fig. 5 is a detail perspective view of the nut that holds the spigot in the vessel and receives the strainer to support it in the vessel.

Briefly described, the apparatus comprises two co-acting agitators 1, mounted on shafts 2 which are journaled in a bracket 3 extending across the top of the vessel 4. The transverse shaft 5 has a bearing 5' in the bracket 3, and carries, flanking said bearing and facing toward each other, two bevel gears 5ª. These bevel gears 5ª mesh with bevel pinions 2ª on the shafts 2. The gears 5ª being outside the pinions 2ª, they act as guards against entanglement between the meshing gears and pinions; the bearing 5', between the gears, forms an elongated handle for the entire apparatus, to be grasped during operation for holding the apparatus stationary. Motion is imparted to the apparatus by means of the crank 6 on one end of the shaft 5. Bearings 2' are formed in the bracket 3 for the upper ends of the agitator shafts 2, and these, together with the other bearings 2'' in the bracket below the pinions 2ª on said shafts 2, serve to support the shafts in the apparatus, end play being prevented by the pinions abutting these bearings.

Each agitator 1 comprises a tubular shaft 1ª and upper member 1', integrally formed, as here shown, and a lower member 1'' attached to the member 1'. The tubular shaft 1ª has, also integral with it, a hub 1ª' which is secured to the shaft 2 by a set screw, so that the tubular shaft and its agitator members may be adjusted up and down on the shaft 2. This hub 1ª' joins its tubular shaft by arms 1ª'', so that the upper end of each tubular shaft is left open for the admission of air. The bracket 3 is curved up, or arched over the vessel, so that the hubs 1ª may be adjusted above the rim of the vessel, whereby the liquid in the vessel may reach a level close to the rim without overflowing the upper ends of the tubular shafts, where such a height of liquid may be desirable.

Each member 1' or 1'' of an agitator 1 consists in a plane body part 1ᵇ' or 1ᵇ'', respectively, with triangular parts 1ᶜ' or 1ᶜ'', respectively, bent at right angles thereto, at intervals therearound, with intervening straight parts 1ᵈ' or 1ᵈ'' of the periphery of the plane body part left intact and exposed, as is best shown in Fig. 1. These lower and upper members, thus formed, are assembled inversely, with the triangular parts of one embracing those of the other. Preferably, the upper one has said parts embracing the corresponding parts of the lower one, so that there will be no lodgement of solid particles, as of butter, between the parts. The members are secured together by passing bent-over points 1ᵉ' of the triangles 1ᶜ' on the upper member 1' through slots 1ᶠ'' in the triangles 1ᶜ'' of the lower member 1'', and passing similar points 1ᵉ'' on the lower member 1'' through similar slots 1ᶠ' in the upper member. The result of such assemblage of these parts is a box-like agitator of polygonal form, some of the sides of which are closed and the others open. On account of the triangular shape of the parts 1ᵇ' and 1ᶜ'', the closed sides will lack triangular regions which merge with the open sides and thus add to the area of the openings from the interior of the agitator, which these openings constitute.

By providing a series of the slots 1ᶠ' and 1ᶠ'', respectively, in the triangular parts of the upper and lower members, in vertical alinement, the distance between the plane body parts of the members may be varied, it only being necessary to insert the points of the triangles into correspondingly different slots.

The upper member has a free opening around the shaft 2 to allow circulation of air from the upper end of the tubular shaft 1ª down into the interior of the agitator, but the lower member fits snugly around the shaft and supports the agitator at its lower end, maintaining it concentric with its shaft.

The closed sides of the box-like agitators being straight, and therefore presenting their surfaces against the liquid as the agitators rotate, an impelling action is exerted, forcing the liquid away from the exteriors of the agitators and producing a partial vacuum in each hollow interior, so that the flow of air, before mentioned, is induced down into said hollow interiors of the agitators. Thus, the air drawn into said interiors, mixing with the liquid drawn therefrom, will be carried out into the main body of liquid in the vessel. A circulation of liquid and air will thus be set up in the liquid, amounting to a combined aerating and mechanical agitation.

The coöperation of the agitators 1 is such that there is a collision of the liquid particles at the middle of the vessel, and an outward ebullition at one side thereof, with a corresponding inward ebullition at the other side, with a continuous circulation of the mingled liquid and air upward and downward and around the interior of the vessel. The consequence is that the entire contents of the vessel are brought into a state of ebullition, or bubbling, resembling very much in appearance the boiling of liquid under the action of heat; of course, however, no such temperature is ever used in the process herein set forth, as boiling temperature is well known to be injurious to all milk products. It is by this utilization of the effects of boiling, or ebullition, in a mechanical way, without entailing the injurious effects of heat, that some of the more important results of the process are reached.

The tangential, and radially inward and outward ebullition above described, may be readily understood upon inspection of Fig. 2. The small black arrows indicate the flow of the liquid and air, and the large arrows indicate the direction of the rotation of the agitators.

It will be seen that, the air arriving in the central interior region of each agitator will be acted upon centrifugally, along with the liquid in such regions, and will also emerge from the open sides of the agitators 1, in an approximately circumferential direction. The two agitators being closely juxtaposed in the vessel, in the same horizontal plane, will thus produce the above described movement of two bodies of air, opposed to each other and meeting in the region between the agitators, and slightly to one side of such region, at a tangent. The liquid currents also meeting in the same regions will, by the tangential collision of the bodies of air, be broken up into particles by the commingling of the colliding bodies of air, which, passing laterally and upwardly of the vessel, will result in the state of ebullition above alluded to. Furthermore, the vessel being circular, affords the laterally disposed space through which the lateral and upward passage of the liquid and air, thus commingled, can most readily take place. Also, in such a circular vessel, or other vessel with concave walls, the lateral and upward passage of the commingled liquid and air is so modified that the ebullition is most evenly distributed throughout the body of the liquid, and the circulation of the liquid, to the regions of tangential collision, is best facilitated.

Whether the vessel be circular, or otherwise, it will be seen that if the space marked A in the drawing, Fig. 2, be present, the space for lateral and upward passage will be provided. Also, if the general shape of the vessel be such that the interior walls are chiefly concave, the facilitation of circulation just mentioned will be afforded. One of the spaces A also affords a location for the strainer 7, over the spigot 4ª which the vessel has for the outlet of liquids. This strainer is substantially half of a cone, of thin pervious material, such as perforated sheet metal or wire screen, with its pervious walls presented inwardly of the vessel and with its triangular open side against the wall of the vessel and embracing the opening into the spigot 4ª. Across the lower end of the open side is a strut 7ª with a notch 7' in its lower edge near the middle thereof. The spigot 4ª is secured in the vessel by passing its shank 4ª' through the wall of the vessel and screwing thereon a nut 4ª''. This nut has recesses 4ª''' at its sides, adjacent the wall of the vessel when it is drawn up to hold the spigot, and the strut 7ª of the strainer 7 is adapted to have its notch 7' receive the nut 4ª'', with the parts of the strut at the sides of the notch lying in the recesses 4ª''' of said nut. Thus the strainer is held firmly in place over the outlet, so that it is not displaced by the agitation of the liquid in the vessel. The purpose of this strainer will be apparent after my novel process has been described.

With the above described means, or similar means, employed, I take the milk elements, either in the form of sweet or sour milk, or sweet or sour cream, and place the liquid in the vessel, filling the vessel to about the height of the broken line B in Fig. 1. If cream, sweet or sour, be used, the temperature at which it is introduced is preferably from 50 to 65 degrees Fahrenheit, while sweet or sour milk may be used at a somewhat higher temperature, or from 65 to 70 degrees Fahrenheit.

For attaining the best results, the agitators should be near the bottom of the body of liquid, as illustrated. The atmosphere, where the operation takes place, may be of the usual living temperature, or about 70 degrees Fahrenheit. With the milk elements thus in the vessel, and the agitators thus adjusted, the agitation, with accompanying aeration hereinbefore described, is maintained for a period of from three to five minutes, or until the whole of the butter elements has been thoroughly separated from the other milk elements with which they were associated in the liquid used. This period of time is ample, due to the superior action to which the substances are subjected by the operation above described. When the separation has thus become complete, the residue from the operation will be present in a uniformly liquid state, while the butter will be distinct therefrom, in its solid state, but divided into particles, somewhat as in old and well known processes of churning. This residue is now drawn off, through the faucet, or otherwise, and a suitable quantity of pure water added, at ordinary temperature, or somewhat below, preferably at from 50 to 55 degrees Fahrenheit. The butter is now agitated and aerated in this body of cool water, in the manner hereinbefore described, to granulate it and to increase the thoroughness of separation of the residue. This body of water, with the residue that it separates from the granules, is drawn off, and fresh water added, continuing the agitating and aerating operation therewith, and such repeated application of the cool water and agitation and aeration may be continued until such operation ceases to cause murkiness in the water applied and drawn off.

If desired, to operate with the greatest convenience and efficiency, the application and drawing off of the water may be continuous, as by supplying it from suitable means, such as the faucet 8, over the rim of the vessel, as shown in Fig. 2.

When the water is found perfectly clear, after such continued operation, which will be of from one to two minutes' duration, the operator may be assured that a most complete separation of the residue from the butter has been accomplished. At this stage, also, the granulation will have become complete, the granules of butter approximating in size, the commonly known granules of sugar. It is through the minute division of the butter substance, into this finely granulated condition, that the action of the aerating and agitating operation, and the repeated application of the water, results in so thorough separation of the residue from the butter. The last of the water may now be withdrawn, and the granulated butter, left in a mass in the vessel, is ready for the salting operation, preparatory to working the butter into the solid consistency that it is to have for use.

For salting the mass of granulated butter, a solution is prepared, composed substantially of one pint of salt to one gallon of water, and introduced into the vessel with the granules at a temperature of from 50 to 55 degrees Fahrenheit, or of about the temperature of the water that was used for the granulation and final separation. The agitation and aeration is now resumed, by the operation of the mechanism, preferably at a speed reduced from that of the separating operations, for a period of from thirty to sixty seconds. This operation, as is readily seen, is the reverse of the separating operations, and the agitation and aeration serves the purpose of bringing salt-solution particles into intimate relation with every particle of the granular mass. Hence, the slowness of the agitation, to cause contact of long duration between the respective particles of the butter and solution, rather than violent action, which, best suited to the separating operations, is here not required.

On completion of the agitation of the granules and solution, as above described, the salt solution may be withdrawn, and the mass of granulated butter, now thoroughly salted, with great homogeneity, may be taken from the vessel and allowed to drain to such an extent as may be convenient, and then worked into the proper useful consistency in any suitable and well known manner. Preferably, however, the salt solution may be retained with the granules floating near its surface, and the granules removed therefrom, by using a pervious ladle or scoop, as this is more convenient than removing the granules from the vessel after the liquid medium has been withdrawn.

The purpose of using the water for the final separating and granulating operation at the relatively low temperature, and of using the salt solution at such a temperature, is to maintain a desirable hardness to the butter granules throughout the operations, so as to produce a finished product of great firmness and fineness of texture, after the final working. Such a temperature, also, is best adapted for initially forming the butter granules during the final separating operation, as above described.

The quickness with which the butter is produced, ready for use, from any of the usual sources of manufacture, and the simplicity of the operations, constitute my method economical in very high degree. At the same time, the thoroughness with which the other elements are removed from the butter, as a result of the complete series of separating operations, imparts to the butter higher keeping qualities, since these foreign elements in ordinary butter are chiefly responsible for the changes the butter undergoes when kept for considerable time. Also, the thoroughness of the first separating operation results in a superior residue, because the aerating operation, instead of causing a mixture of butter elements with the other elements in the residue, as is the case with simple agitation, and with indifferent forms of aeration, completely separates the different elements. Thus, with the use of cream, the resultant buttermilk will be a distinct product, without the particles of butter usually found present in it, when it is the reside from such ordinary churning operations. The residue from the use of milk, either sweet or sour, will likewise be a distinct product, with the absence of a large proportion of the milk solids other than the butter elements, which were combined with the butter elements in the butter made from such whole milk. Butter made from whole milk is of superior food value, owing to the high variety of nutritious ingredients contained. My method of producing such butter results in an especially homogeneous combination of these elements in the finished product.

From the above, it will be seen that, along with increased economy of production, butter, and the residue therefrom, will have higher useful values.

While I have illustrated means and certain specified rules of procedure in exemplifying my method, I do not wish to be understood as being limited to them precisely, but

What I claim as new and desire to secure by Letters Patent is:

1. The method of producing butter consisting in producing ebullition in a body of milk elements by tangential collision of two volumes of air therein, in a vessel with unobstructed concave walls.

2. The method of producing butter consisting in producing ebullition in a body of milk elements by rotation solely of hollow agitators therein, tangentially to each other, with means to supply atmospheric air to the hollow agitators and to allow it to escape freely, under atmospheric pressure, into the milk elements, in separate volumes from the respective hollow agitators, and to collide tangentially.

3. The method of producing butter consisting in producing ebullition in a body of milk elements by tangential collision of two bodies of air near the bottom thereof, in a vessel with unobstructed concave walls.

4. The method of producing butter consisting in producing ebullition in a body of milk elements for a period of from three to ten minutes by causing two volumes of air, under atmospheric pressure, to collide in the central region of the body, to separate the butter from the other milk elements, then drawing off the residue, then placing a quantity of fresh water in association with the butter and producing ebullition in the water and butter thus associated, for a period of from one to two minutes, to granulate the butter, then drawing off the water and placing a solution of salt and water in association with the granulated butter, and then producing ebullition in the solution and butter for a period of from thirty to sixty seconds, and then withdrawing the uncombined salt solution, and suitably working the salted granules to consistency for use.

5. The method of producing butter consisting in producing ebullition in a body of milk elements until the butter is separated from the other milk elements, then withdrawing the residue from the butter, then applying fresh water to the butter and producing ebullition in the water and butter until the residue is completely separated from the butter and the butter is granulated, then drawing off the last of the water, then applying a salt solution to the butter and producing ebullition in the solution and butter until the butter is thoroughly salted, and then withdrawing the uncombined solution, and suitably working the salted granules to consistency for use.

6. The method of producing butter consisting in separating the butter while the milk elements are in a state of ebullition produced solely by juxtaposed hollow agitators with atmospheric inlets causing collision of separate volumes of air under atmospheric pressure in the central region of the body of milk elements.

7. The method of producing butter consisting in separating the butter by producing ebullition by drawing air under atmospheric pressure into the milk elements, and suitably dissociating the butter, thus separated, from the resultant residue.

8. The method of producing butter consisting in separating the butter by producing ebullition by drawing air under atmospheric pressure into the milk elements, withdrawing the resultant residue, and then applying and withdrawing fresh water to and from the butter and producing ebullition in the water in association with the butter, until the separation of said residue is thorough and complete.

9. The method of producing butter which consists in separating the butter by producing ebullition by drawing air under atmospheric pressure into the milk elements, withdrawing the resultant residue, and then applying and withdrawing fresh water to and from the butter, continuously, and keeping up ebullition therein, until the separation of said residue is thorough and complete, and until said butter is granulated, for the purposes set forth.

10. The method of producing butter which consists in separating the butter by producing ebullition by drawing air under atmospheric pressure into the milk elements, withdrawing the resultant residue, then applying and withdrawing fresh water to and from the butter, and keeping up ebullition therein, until the separation of said residue is thorough and complete, and until said butter is granulated, and then withdrawing the last of the water and applying salt solution to the butter and producing ebullition therein, until the granules are thoroughly salted, and then withdrawing the uncombined salt solution and suitably working the granules to consistency for use.

11. The method of producing butter consisting in separating the butter by producing ebullition in the milk elements, and suitably dissociating the butter, thus separated, from the resultant residue.

ALPHEUS FAY.

Witnesses:
HATTIE M. FAY,
CLARENCE PUDEN.